(12) United States Patent
Jiang et al.

(10) Patent No.: US 11,521,199 B2
(45) Date of Patent: Dec. 6, 2022

(54) METHOD AND APPARATUS FOR CONFIGURING SECURITY CARRIER

(71) Applicant: CHINA UNIONPAY CO., LTD., Shanghai (CN)

(72) Inventors: Ke Jiang, Shanghai (CN); Naigeng Ji, Shanghai (CN); Yisheng Fu, Shanghai (CN); Feng Tian, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 609 days.

(21) Appl. No.: 16/611,402

(22) PCT Filed: Mar. 29, 2018

(86) PCT No.: PCT/CN2018/081140
§ 371 (c)(1),
(2) Date: Nov. 6, 2019

(87) PCT Pub. No.: WO2018/214646
PCT Pub. Date: Nov. 29, 2018

(65) Prior Publication Data
US 2020/0167762 A1    May 28, 2020

(30) Foreign Application Priority Data
May 24, 2017    (CN) .......................... 201710374726.5

(51) Int. Cl.
*G06Q 20/34*    (2012.01)
*G06Q 20/32*    (2012.01)
(Continued)

(52) U.S. Cl.
CPC ......... *G06Q 20/3574* (2013.01); *G06F 21/57* (2013.01); *G06Q 20/3227* (2013.01); *G06Q 20/3563* (2013.01); *G06Q 20/409* (2013.01)

(58) Field of Classification Search
CPC ........... G06Q 20/3574; G06Q 20/3227; G06Q 20/3563; G06Q 20/409; G06Q 20/321;
(Continued)

(56) References Cited

U.S. PATENT DOCUMENTS 8,875,228 B2    10/2014   Gargiulo et al.
9,009,476 B2 *   4/2015   Zhuang .............. G06Q 20/3552
                                                713/168
(Continued)

FOREIGN PATENT DOCUMENTS

CN    102510391 B    6/2012
CN    105592091 A    5/2016
(Continued)

OTHER PUBLICATIONS

The World Intellectual Property Organization (WIPO) International Search Report for PCT/CN2018/081140 dated Jun. 11, 2018 5 pages.

*Primary Examiner* — Beemnet W Dada
(74) *Attorney, Agent, or Firm* — Anova Law Group, PLLC

(57) ABSTRACT

Embodiments of the present disclosure provide a method and apparatus for configuring a security carrier, including: adding a carrier batch field to a security carrier list, encoding, for each security carrier in the security carrier list, a plurality of pieces of batch feature information of the security carrier according to a preset encoding rule, so as to generate carrier batch information of each security carrier, and to add same to the security carrier list; and then, according to identifier information and the carrier batch information of each security carrier, configuring a supplementary security domain, a card application, an application installation package and an application provider that need to be preset for each security carrier. Since the carrier batch information contains a plurality of pieces of batch feature (Continued)

information of the security carrier, security carriers in the security carrier list can be effectively distinguished according to the identifier information and the carrier batch information of the security carriers, thus a plurality of preset items that need to be preset for a plurality of security carriers having the same carrier batch information can be configured, so as to improve configuration efficiency for the security carriers.

11 Claims, 2 Drawing Sheets

(51) Int. Cl.
  *G06Q 20/40* (2012.01)
  *G06F 21/57* (2013.01)
(58) Field of Classification Search
  CPC ............. G06Q 20/3229; G06Q 20/326; G06Q 20/3825; G06Q 20/3829; G06F 21/57
  See application file for complete search history.

(56) References Cited

U.S. PATENT DOCUMENTS

| | | | |
|---|---|---|---|
| 10,356,082 B2* | 7/2019 | Rykowski | ........... H04L 63/0823 |
| 2008/0283592 A1* | 11/2008 | Oder, II | ............... G06Q 20/382 |
| | | | 235/380 |
| 2009/0170472 A1 | 7/2009 | Chapin et al. | |
| 2014/0019746 A1* | 1/2014 | Hans | ....................... H04W 4/80 |
| | | | 713/150 |

FOREIGN PATENT DOCUMENTS

| | | |
|---|---|---|
| CN | 105607938 A | 5/2016 |
| CN | 105719391 A | 6/2016 |
| CN | 106485486 A | 3/2017 |
| CN | 107169762 A | 9/2017 |
| CN | 101816002 A | 1/2018 |
| TW | 201643789 A | 12/2016 |
| TW | 201737173 A | 10/2017 |

* cited by examiner

METHOD AND APPARATUS FOR CONFIGURING SECURITY CARRIER

RELATED APPLICATIONS

This application is a national stage entry of International Patent Application No. PCT/CN2018/081140, filed on Mar. 29, 2018, which claims priority to Chinese Patent Application No. 201710374726.5, titled "METHOD AND APPARATUS FOR CONFIGURING SECURITY CARRIER", filed on May 24, 2017, content of all of which is incorporated by reference in its entirety.

FIELD OF THE TECHNOLOGY

This application relates to the field of data processing technology and, specifically, to a method and apparatus for configuring security carrier.

BACKGROUND

Currently, various types of IC (Integrated Circuit) cards (such as bank cards, transportation cards, etc.) are becoming more and more widely used in people's lives. With continuous development of Internet technology and mobile applications, various types of Internet shopping scenarios are becoming increasingly popular. Traditional ways to issue physical IC cards over the counter cannot meet people's needs, and people need to apply for IC cards in real time for mobile payments without geographical restrictions. Thus, an over-the-air card issuing service has emerged.

In the over-the-air card issuing service, various types of card issuers issue virtual IC cards by accessing a TSM (Trusted Service Management) platform. Users submit card applications via Internet, and the users download the virtual IC cards to security carriers of smart phones or other types of smart terminals after the applications are approved, thereby making the mobile payments.

In current technologies, before various types of card issuers issue the virtual IC cards via system platforms, the security carrier issuers need to configure the security carriers, including a supplementary security domain, a card application, an application installation package, and an application provider. However, due to different service scenarios, the supplementary security domains, the card applications, the application installation packages, and the application providers have their own configuration rules. For example, different security carrier manufacturers have different configuration requirements for the supplementary security domains of different partners; different security carrier issuers also have different configuration requirements for different card applications or application installation packages. Also, some application providers may require the security carrier issuer to customize the security carriers, and the customized security carrier can only download the card application of the application provider. Therefore, security carrier configuration is very complicated, and configuration efficiency is relatively low.

Thus, currently, a method for configuring security carrier is needed to solve technical problems of complicated security carrier configuration and low configuration efficiency in the current technologies.

SUMMARY

The present disclosure provides a method and apparatus for a configuring security carrier, solving technical problems of complicated security carrier configuration, less efficient configuration in the current technologies.

In a first aspect, an embodiment of the present invention provides a method for configuring security carriers, including the following steps:

Adding a carrier batch field to a security carrier chip list, where the security carrier list comprises at least one security carrier;

Encoding, for a first security carrier chip in the security carrier chip list, a plurality of pieces of batch feature information of the first security carrier chip according to a preset encoding rule, so as to generate first carrier batch information of the first security carrier chip, and add to the first carrier batch information to the carrier batch field corresponding to a record where the first security carrier chip is located in the security carrier chip list, where the first security carrier chip is any security carrier chip, for which no carrier batch information has been configured, in the security carrier chip list;

Configuring a supplementary security domain, a card application, an application installation package and an application provider for each of the security carrier chips according to identifier information and the carrier batch information of each security carrier chip in the security carrier chip list.

Optionally, the plurality of pieces of batch feature information in the carrier batch information of the first security carrier chip at least comprises: a carrier issuer identifier, a carrier type, a batch number, generation time, and a reserved bit.

Optionally, according to identifier information and the carrier batch information of each security carrier chip in the security carrier chip list, configuring the supplementary security domain for each of the security carrier chips, including:

For each carrier batch information in the carrier batch information list, setting each carrier batch information to be associated with corresponding N number of supplementary security domains, where N is an integer greater than or equal to 1; and Based on preset setting rules of the supplementary security domains, setting each security carrier chip with each carrier batch information as presetting first supplementary security domain or creating dynamically the first supplementary security domain, where the first supplementary security domain is any supplementary security domain among the N number of supplementary security domains corresponding to each carrier batch information.

Optionally, according to identifier information and the carrier batch information of each security carrier chip in the security carrier chip list, configuring a card application, an application installation package for each of the security carrier chips, further including:

For each carrier batch information in the carrier batch information list, setting each carrier batch information to be associated with corresponding M number of card applications, where M is an integer greater than or equal to 1; and Based on preset setting rules of the card applications, setting each security carrier with each carrier batch information as presetting first card application or dynamic loading the first card application, where the first card application is any card application among the M number of card applications corresponding to the first carrier batch information.

If determining each security carrier chip with each carrier batch information is configured as dynamic loading the first card application, each security carrier with each carrier batch information is set for presetting the application installation package of the first card application or non-presetting the application installation package of the first card application.

Optionally, according to identifier information and the carrier batch information of each security carrier chip in the security carrier chip list, configuring access privileges of the application provider for each of the security carrier chips, further including:

For each carrier batch information in the carrier batch information list, based on preset configuration rules of the application providers, configuring each carrier batch information to be associated with corresponding P number of application providers, and configuring each security carrier with each carrier batch information to access applications provided by a first application provider, where the first application provider is any application provider among the P number of application providers.

In a second aspect, based on the same disclosing concept, an embodiment of the present invention also provides an apparatus for configuring security carriers. The apparatus includes the followings.

An adding module that is configured to add a carrier batch field to a security carrier list, where the security carrier list comprises at least one security carrier.

A processing module that is configured to encode, for a first security carrier in the security carrier list, a plurality of pieces of batch feature information of the first security carrier according to a preset encoding rule, so as to generate first carrier batch information of the first security carrier, and to add the first carrier batch information to the carrier batch field corresponding to a record where the first security carrier is located in the security carrier list, where the first security carrier is any security carrier, for which no carrier batch information has been configured, in the security carrier list.

A configuration module that is configured to configure a supplementary security domain, a card application, an application installation package, and an application provider for each of the security carriers according to identifier information and the carrier batch information of each security carrier in the security carrier list.

Optionally, the plurality of pieces of batch feature information in the carrier batch information of the first security carrier at least comprises: a carrier issuer identifier, a carrier type, a batch number, generation time, and a reserved bit.

Optionally, the configuration module is specifically configured to:

for each carrier batch information in the carrier batch information list, set each carrier batch information to be associated with corresponding N number of supplementary security domains, where N is an integer greater than or equal to 1; and based on preset setting rules of the supplementary security domains, set each security carrier chip with each carrier batch information as presetting first supplementary security domain or creating dynamically the first supplementary security domain, where the first supplementary security domain is any supplementary security domain among the N number of supplementary security domains corresponding to each carrier batch information.

Optionally, the configuration module is also specifically configured to:

for each carrier batch information in the carrier batch information list, set each carrier batch information to be associated with corresponding M number of card applications, where M is an integer greater than or equal to 1; and based on preset setting rules of the card applications, set each security carrier with each carrier batch information as presetting first card application or dynamic loading the first card application, where the first card application is any card application among the M number of card applications corresponding to the first carrier batch information.

If determining each security carrier with each carrier batch information is configured as dynamic loading the first card application, each security carrier with each carrier batch information is set for presetting the application installation package of the first card application or non-presetting the application installation package of the first card application.

Optionally, the configuration module is also specifically configured to:

for each carrier batch information in the carrier batch information list, based on preset configuration rules of the application providers, configure each carrier batch information to be associated with corresponding P number of application providers, and configure each security carrier with each carrier batch information to access applications provided by a first application provider, where the first application provider is any application provider among the P number of application providers.

In a third aspect, an embodiment of the present invention provides a computing device. The computing device includes:

A memory may be used to store program instructions; and

A processor may be used to call the program instructions stored in the memory and execute any above described method according to the obtained programs.

In a fourth aspect, an embodiment of the present invention provides a computer-readable storage medium storing computer-executable instructions that, when executed by a computer, facilitate perform any above described method.

In a fifth aspect, an embodiment of the present invention provides a computer program product that, when executed by a computer, facilitate perform any above described method.

In the embodiments of the present disclosure, by adding a carrier batch field to a security carrier list, for each security carrier in the security carrier list, encoding a plurality of pieces of batch feature information of the security carrier according to a preset encoding rule, so as to generate carrier batch information of each security carrier, and add the carrier batch information to the security carrier list; and then, according to identifier information and the carrier batch information of each security carrier, configuring a supplementary security domain, a card application, an application installation package and an application provider that need to be preset for each security carrier. Since the carrier batch information contains a plurality of pieces of batch feature information of the security carrier, security carriers in the security carrier list can be effectively distinguished according to the identifier information and the carrier batch information of the security carriers, thus the supplementary security domain, the card application, the application installation package and the application provider that need to be preset for a plurality of security carriers having the same carrier batch information can be configured, so as to improve configuration efficiency for the security carriers.

BRIEF DESCRIPTION OF THE DRAWINGS

In order to more clearly illustrate the technical solutions in the embodiments of the present invention, the drawings used in the description of the embodiments will be briefly described below. It is obvious that the drawings in the following description are only some embodiments of the present invention, and those skilled in the art can obtain other drawings based on these drawings without inventive efforts.

DESCRIPTION OF EMBODIMENTS

To make clearer of the objectives, technical solutions, and advantages of the present disclosure, the followings further describe the present disclosure in detail with reference to the accompanying drawings. Obviously, the described embodiments are only some but not all of the embodiments of the present disclosure. All other embodiments obtained by a person of ordinary skill in the art based on the disclosed embodiments of the present disclosure without creative efforts are within the scope of the present disclosure.

In the embodiments of the present invention, security carriers may be built in smart phones, smart watches, and other smart terminals in the form of a security carrier chip. The security carriers may be also set in SIM (Subscriber Identification Module) cards or SD (Secure Digital Memory) cards, which are not specifically limited herein. In the following, a full mobile phone mode that the security carrier chip is built in the mobile phone is described as an example.

A method for configuring security carrier may be applied to a process for configuring the security carrier by a TSM (Trusted Service Management) system, specifically, including configuration of preset conditions of one or more preset items of the security carrier. The followings further describe the present disclosure in detail with reference to the accompanying drawings.

Figure 1:
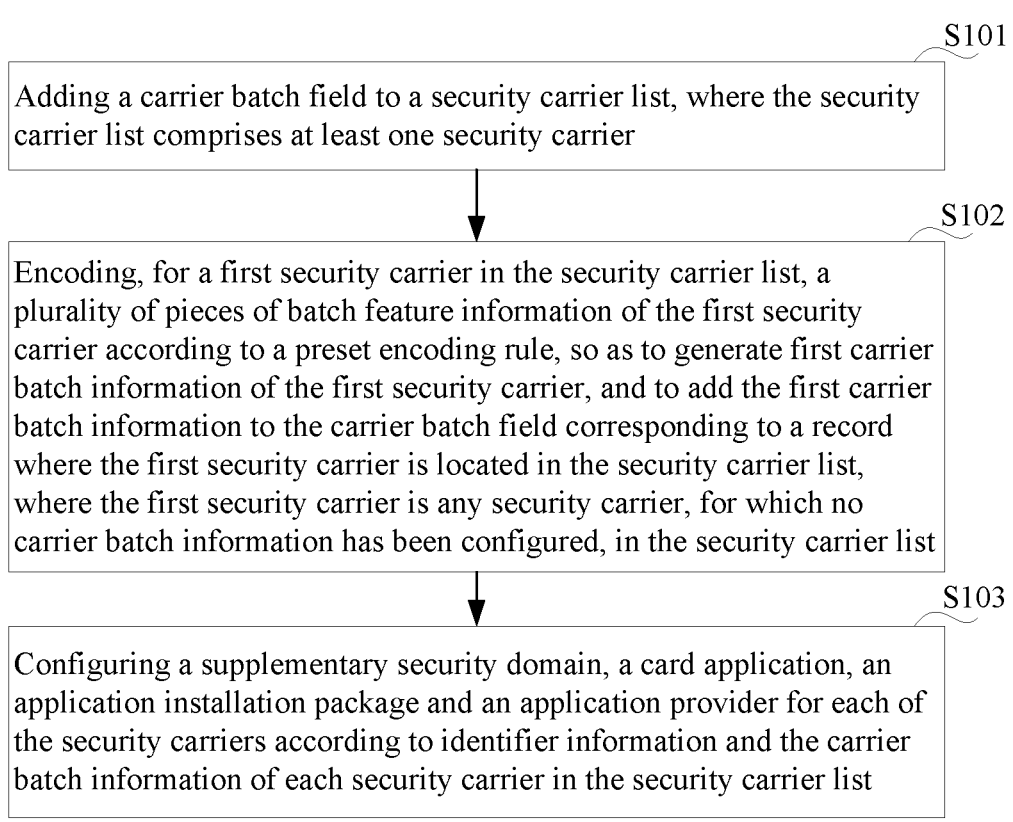
FIG. 1 illustrates a schematic flow chart of a method for configuring security carrier according to an embodiment of the present invention.

FIG. 1 illustrates a schematic flow chart of a method for configuring security carrier according to the embodiment of the present invention. As shown in FIG. 1, the method includes the following steps S101 to S103.

Step S101: Adding a carrier batch field to a security carrier list, where the security carrier list comprises at least one security carrier.

Step S102: Encoding, for a first security carrier in the security carrier list, a plurality of pieces of batch feature information of the first security carrier according to a preset encoding rule, so as to generate first carrier batch information of the first security carrier, and to add the first carrier batch information to the carrier batch field corresponding to a record where the first security carrier is located in the security carrier list, where the first security carrier is any security carrier, for which no carrier batch information has been configured, in the security carrier list.

Step S103: Configuring a supplementary security domain, a card application, an application installation package and an application provider for each of the security carriers according to identifier information and the carrier batch information of each security carrier in the security carrier list.

In the embodiments of the present invention, by adding the carrier batch field to the security carrier list, for each security carrier in the security carrier list, the plurality of pieces of batch feature information of the security carrier are encoded, according to the preset encoding rule, so as to generate the carrier batch information of each security carrier, and add the carrier batch information to the security carrier list. Further, according to the identifier information and the carrier batch information associated with each security carrier, preset access privileges of the supplementary security domain, the card application, the application installation package and the application provider for each of the security carriers can be configured. Due to the carrier batch information comprising a plurality of pieces of batch feature information of the security carrier, according to the identifier information and the carrier batch information of the security carrier, the security carriers in the security carrier list may be effectively classified. Furthermore, a plurality of preset items for a plurality of the security carriers with the same carrier batch information can be implemented the same configuration, thereby improving configuration efficiency of each preset item in the security carrier.

In the embodiments of the present invention, specifically, a parameter management platform performs operations on a database of a TSM system to configure the security carriers.

Specifically, the database of the TSM system includes one or more security carrier lists, and the security carrier lists store attribute information of the security carrier. The attribute information of the security carrier may include a security carrier identifier, a carrier manufacturer identifier, a carrier issuer identifier, a carrier communication status and so on.

The security carrier identifier is used to uniquely identify the security carrier, which may be a combination of one or more of numbers, letters or other characters, which is not limited herein. The carrier manufacturer identifier and the carrier issuer identifier respectively occupy 6 bits, which may be a combination of one or more numbers, letters or symbols. The carrier communication status is used to identify whether the current security carrier communication status is abnormal, which may be indicated by a 2-bit status code.

In Step S101, the parameter management platform may add the carrier batch field to the security carrier lists in the database. That is, the parameter management platform adds a carrier batch attribute to each security carrier in the security carrier lists. For each security carrier in the security carrier lists, the carrier batch information of the carrier batch attribute corresponding to the security carrier may be also obtained by the plurality of pieces of batch feature information of the security carrier.

In Step S102, for a first security carrier-to-be-configured in the security carrier list, the parameter management platform may encode a plurality of pieces of batch feature information of the security carrier according to a preset encoding rule, so as to obtain the carrier batch information corresponding to the first security carrier, and add the carrier batch information to the carrier batch field corresponding to the first security carrier in the security carrier list, where the first security carrier is any security carrier, for which no carrier batch information has been configured, in the security carrier list.

In the embodiments of the present invention, the plurality of pieces of batch feature information in the carrier batch information includes a carrier issuer identifier, a carrier type, a batch number, carrier generation time, and a reserved bit, where the carrier type may be one of a full mobile phone, a SIM card, a SD card, a smart bracelet, a smart watch, or other types, which is not limited in herein. Accordingly, the batch number, the carrier generation time and the reserved bit can be set by those skilled in the art based on actual situations, which is not limited herein.

However, those skilled in the art may select appropriate encoding rule to encode the plurality of pieces of batch feature information based on actual situations. For example, the plurality of pieces of batch feature information can be encoded according to order of the carrier issuer identifier, the carrier type, the batch number, the generation time, and the reserved bit, which is not particularly limited herein.

The security carrier with the same carrier issuer identifier, the same carrier type, the same batch number, the same generation time, and the same reserved bit has the same carrier batch information. Therefore, according to the carrier batch information, the security carriers can be effectively distinguished.

It should be noted that in Step S102, specifically, the carrier batch information is configured for each security carrier-to-be-configured in the security carrier list, thereby associating the security carrier with the carrier batch information. In the embodiments of the present invention, the parameter management platform may also associate the security carrier with the carrier batch information by other modes. For example, the carrier batch information of each unassociated security carrier in the carrier batch information list in the database may be associated with the corresponding security carrier one by one, which is not limited herein.

In the embodiments of the present invention, after the security carrier is associated with the carrier batch information by the above mode, a many-to-one relationship is created between the security carrier and the carrier batch information. That is, one security carrier can only be associated with one carrier batch information, and multiple security carriers may be associated with the same carrier batch information.

However, for the security carriers, in general, the carrier batch information corresponding to each security carrier is not changed. If the carrier batch information corresponding to one security carrier needs to be updated, the parameter configuration platform may find the security carrier-to-be-updated by querying the security carrier lists, and then configure new carrier batch information for the security carrier-to-be-updated.

Furthermore, in Step S103, according to the identifier information and the carrier batch information of each security carrier in the security carrier list, the parameter management platform may configure one or more preset items in each security carrier, where the preset items include a supplementary security domain, a card application, an application installation package, and an application provider.

The following are specifically described for configurating the supplementary security domain, the card application, the application installation package, and the application provider.

1. Supplementary Security Domain

Security domains are applications that are responsible for key and security management in the security carrier. The security domains provide various security services in an over-the-air card issuing service, including key handling, encryption, decryption, digital signature generation and verification. Specifically, the security carriers have various types of security domains, including an issuer security domain, a supplementary security domain, and a controlling authority security domain. Also, each security domain typically contains a plurality of attribute information, including a security domain identifier, a security domain name, a security domain privilege, a security domain type, and an associated security domain.

In general, the security carrier includes only one issuer security domain, also known as a primary security domain.

The issuer of the security carrier (e.g., mobile phone manufacturers) can initiate card application and download, as well as card life cycle management and other operations for each application provider by the issuer security domain.

The issuer security domain may be associated with multiple supplementary security domains. Depending on different business implementation models, the supplementary security domains associated with the issuer security domain of the security carrier with different carrier batch information may be different. Moreover, in real application scenarios, the supplementary security domains may be preset in the security carrier or created dynamically.

Therefore, when the supplementary security domains of the security carrier are configured, in the beginning, based on business implementation policies, an association relationship between the carrier batch information of the security carrier and the supplementary security domains is created. That is, for each carrier batch information in the carrier batch information list, N number of supplementary security domains associated with the carrier batch information may be determined. Also, the carrier batch information is associated with the corresponding N number of supplementary security domains, where N is an integer greater than or equal to 1.

In the embodiments of the present invention, based on actual needs, the association relationship between the carrier batch information and the supplementary security domains may be set by those skilled in the art. For example, the relationship may be shown in the following relationship table:

TABLE

Relationship between carrier batch information and supplementary security domain

| Security Carrier Batch | Supplementary Security Domain Identifier | Mutable Space limitation | Immutable Space Limitation | Preset or Not |
| --- | --- | --- | --- | --- |

Specifically, by querying the carrier batch information list, the parameter management platform may associate each carrier batch information that is not associated with the supplementary security domain in the carrier batch information list with the corresponding N number of supplementary security domains one by one. Alternatively, by querying a supplementary security domain list, the parameter management platform can also associate the supplementary security domains with the corresponding carrier batch information one by one.

The supplementary security domain may be preset in the security carrier or created dynamically when the card application is downloaded. Therefore, after each carrier batch information is associated with the corresponding N number of supplementary security domains, the parameter management platform still needs to set whether the supplementary security domains associated with each carrier batch information are a preset mode.

For example, for a first supplementary security domain among the N number of supplementary security domains corresponding to a first carrier batch information, based on preset rules of the supplementary security domain, the parameter management platform set the first supplementary security domain associated with the first carrier batch information as the preset or non-preset mode, where the first supplementary security domain is any supplementary security domain among the N number of supplementary security domains.

Specifically, a field indicating whether the supplementary security domain is preset is set in the association relationship table between the carrier batch information and the supplementary security domain. For example, this field may be indicated by a 2-bit status code. That is, 00 indicates that the supplementary security domain is preset in the security carrier, and 01 indicates that the supplementary security domain is not preset in the security carrier. Alternatively, other modes may also be used to indicate whether the supplementary security domain is preset, which are not limited here.

In the embodiments of the present invention, based on actual situations, the supplementary security domain setting rule is provided by those skilled in the art. The rule may be related to the security carrier manufacturer or a specified cooperation mode between the security carrier manufacturer and the issuer, which is not specifically limited here.

Thus, when the supplementary security domains of the security carrier are configured, based on the security carrier identifier, the carrier batch information associated with the security carrier is found, such that various supplementary security domains associated with the carrier batch information are located, and then each associated supplementary security domain is set as the preset mode or non-preset mode. If one supplementary security domain of the security carrier is set as the preset mode, the supplementary security domain may be preset in the security carrier. Accordingly, if one supplementary security domain of the security carrier is set as the non-preset mode, the supplementary security domain may be created dynamically in the subsequent card operations (e.g., when a card application is downloaded).

It should be noted that, in the embodiments of the present invention, after the parameter management platform sets the association relationship between the carrier batch information and the supplementary security domain, if the association relationship between one carrier batch information and the supplementary security domain needs to be modified, by performing an update operation in the database, the parameter management platform can modify or destroy the association relationship, or change whether the supplementary security domain is preset. For example, by querying the relationship table between the carrier batch information and the supplementary security domain, the parameter management platform may select an association relationship-to-be-updated, update the association relationship between the carrier batch information and the supplementary security domain, and validate the configuration.

2. Card Application and Application Installation Package

The card application refers to various application providers issuing various types of virtual IC cards, including bank cards, public transportation cards, by an over-the-air card issuing process of the TSM platform. After a user downloads the card application to the security carrier by downloading, installation, and personalization, mobile payments can be made by the card application.

For one card application, the card application may have the following attribute information in the database system of the TSM platform, including an application identifier, an application version number, an application name, an application profile, an application type, and so on. In practical application scenarios, the card application may be upgraded. The upgraded application version number is incremented, but the application identifier remains unchanged. Therefore, a combination of the application identifier and the application version number may be used as a unique identifier of the card application.

In the embodiments of the present invention, when the card application and the application installation package of the security carrier are configured, in the beginning, based on business implementation policies, association relationships between the carrier batch information and the card application are created. That is, for each carrier batch information in the carrier batch information list, M number of card applications that can be downloaded are determined. Then, the carrier batch information is associated with the corresponding M number of card applications, where M is an integer greater than or equal to 1.

Specifically, the parameter management platform may set an association relationship between the carrier batch information and the card applications by many modes. For example, by querying the carrier batch information list, each carrier batch information in the carrier batch information list may be associated with the corresponding card application one by one. Alternatively, by querying the card application list, each card application in the card application list may be associated with the corresponding carrier batch information one by one.

In the embodiments of the present invention, the set association relationship between the carrier batch information and the card application may be shown in the following relationship table:

TABLE

Relationship table between carrier batch information and card application

| Carrier Batch Information | Application Identifier | Application Version Number | Whether Card Application is Preset | Whether Application Installation Package is Preset |
| --- | --- | --- | --- | --- |
| | | | | |

As seen above, the association relationship between the carrier batch information and the card application presents a many-to-many relationship. That is, one carrier batch information can be associated with multiple card applications, and one card application can also be associated with a plurality of carrier batch information.

Since a process for downloading the card application is relatively time-consuming, in actual service scenarios, in order to enhance user experience, the card application may be preset in the security carrier. Therefore, whether each card application associated with the carrier batch information is preset in the security carrier, and whether the application installation package of the card application is preset in the security carrier need to be further set.

For example, the first carrier batch information is associated with the M number of card applications. For the first card application among the M number of card applications, the parameter management platform may set the first card application to be preset in the security carrier, or the first card application to be loaded dynamically, where the first card application is any card application among the M number of card applications.

If the first card application is set as dynamic loading, that is, the first card application is not preset in the security carrier, the parameter management platform may further set whether the application installation package of the first card application is preset in the security carrier. The parameter management platform may set the application installation package preset in the security carrier or dynamic loading when the card application is downloaded. If the application installation package of the first card application is preset in the security carrier, the user only needs to run installation and customized steps.

Specifically, two fields indicating respectively whether the card application is preset and whether the application installation package is preset are set in the association relationship table between the carrier batch information and the card application. For example, each of these two fields may be indicated by a 2-bit status code. That is, 00 indicates that the card application or the application installation package is preset in the security carrier, and 01 indicates that the card application or the application installation package is not preset in the security carrier. Alternatively, other modes may be used to indicate whether the card application or the application installation package is preset, which are not limited herein.

Thus, when the card application of the security carrier is configured, based on the security carrier identifier, the carrier batch information associated with the security carrier is found, such that various card applications associated with the carrier batch information are located by the association relationship between the carrier batch information and the card application, and then whether each card application and the application installation package of each card application are preset is set.

3. Application Provider

The application provider is a provider and manager of the card applications. The application provider is responsible for the card life cycle management, including application, activation, personalization, and deletion.

Currently, the security carrier is not limited to be built in the user's mobile terminal device (e.g., smart phones). Various wearable devices such as smart watches or smart bracelets may also participate in the over-the-air card issuing service of the TSM platform by transmitting data via Bluetooth. That is, as mobile phone manufacturers, wearable device manufacturers may also be the security carrier issuers.

With development of the over-the-air card issuing service, the cooperation modes between the application providers and the carrier issuers are more diverse. Considering marketing and other factors, application providers often require for customizing access privileges of the security carrier, such that the security carrier can only access the card applications provided by specific application providers, especially for Bluetooth wearable devices, such as smart watches, bracelets and so on. For example, the wearable device manufacturers may cooperate with banks to produce wearable devices (e.g., smart watches or bracelets) customized by one card issuing bank, and require the wearable device to access only the card applications issued by the card issuing bank, enhancing the user's specific experience, as well as publicity for the card issuing bank. Accordingly, in the TSM system, one application accessed by the wearable device can be controlled by one access control module. Therefore, in this scenario, it is necessary to configure the application providers accessed by the security carrier.

In the embodiments of the present invention, the application providers may include application providers in various industries, such as banks, public transportation, subway and so on. In the database system of the TSM platform, an application provider may have a plurality of attributes, including an application provider identifier, an application provider type, an application provider name, an application provider LOGO, and a contact address, where the application provider identifier may be a 6-bit application provider code, and the application provider type may be a 2-bit type code used to distinguish application provider industries.

Therefore, when the application providers of the security carrier are configured, in the beginning, based on business implementation policies, the association relationship between the carrier batch information and the application providers is created. That is, for each carrier batch information in the carrier batch information list, based on preset configuration rules of the application providers, the parameter management platform configures each carrier batch information associated with the corresponding P number of application providers, and configures that various security carriers of each carrier batch information to access applications provided by a first application provider, where P is an integer greater than or equal to 1.

Specifically, the parameter management platform may set an association relationship between the carrier batch information and the application providers by many modes. For example, by querying the carrier batch information list, each carrier batch information in the carrier batch information list is associated with the corresponding application providers one by one. Alternatively, by querying the application provider list, each application provider in the application provider list is associated with the corresponding carrier batch information one by one.

According to an embodiment of the present disclosure, the set association relationship between the carrier batch information and the application providers may be shown in the following relationship table:

TABLE

| Association relationship between carrier batch information and application providers | |
|---|---|
| Carrier Batch Information | Application Provider Identifier |
|  |  |

As seen above, the association relationship between the carrier batch information and the application providers presents a many-to-many relationship. That is, one carrier batch information may be associated with multiple application providers, and one application provider may also be associated with a plurality of carrier batch information.

Thus, when the application providers of the security carrier are configured, based on the security carrier identifier, the carrier batch information associated the security carrier is found, and then the accessible application providers for the security carrier are determined by the association relationship between the carrier batch information and the application providers. As seen above, by configuring the application providers, the application providers accessed by the security carrier can be effectively controlled to realize customization for the application providers of the security carrier.

In the embodiments of the present invention, based on actual needs, those skilled in the art may set the preset configuration rules of the application providers, such as business cooperation models between the security carrier issuer and the application providers, or other rules, which are not limited herein.

It should be noted that, in the embodiments of the present invention, when the parameter management platform configures the supplementary security domain, the card application, the application installation package, and the application provider, the parameter management platform firstly add the association relationship-to-be-configured, such as the association relationship between the carrier batch information and the supplementary security domain, to a temporary table in the database. At this time, an online system of the TSM still cannot access the association relationship. Then, a validation button is clicked to transfer association relationship data from the temporary table to the official table, validating the configuration.

Figure 2:
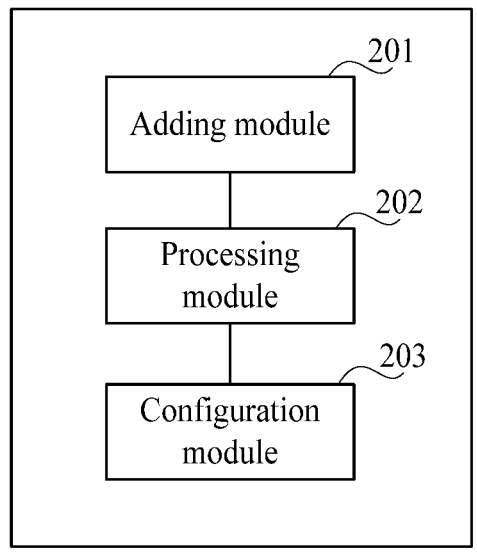
FIG. 2 illustrates a schematic structural diagram of an apparatus for configuring security carrier according to an embodiment of the present invention.

According to an embodiment of the present disclosure, an apparatus for configuring a security carrier is also provided. As shown in FIG. 2, the apparatus includes the followings.

An adding module 201 that is configured to add a carrier batch field to a security carrier list, where the security carrier list comprises at least one security carrier.

A processing module 202 that is configured to encode, for a first security carrier in the security carrier list, a plurality of pieces of batch feature information of the first security carrier according to a preset encoding rule, so as to generate first carrier batch information of the first security carrier, and to add the first carrier batch information to the carrier batch field corresponding to a record where the first security carrier is located in the security carrier list, where the first security carrier is any security carrier without configured carrier batch information in the security carrier list.

A configuration module 203 that is configured to configure a supplementary security domain, a card application, an application installation package, and an application provider for each of the security carriers according to identifier information and the carrier batch information of each security carrier in the security carrier list.

Optionally, the plurality of pieces of batch feature information in the carrier batch information of the first security carrier comprises: a carrier issuer identifier, a carrier type, a batch number, generation time, and a reserved bit.

Optionally, the configuration module 203 is specifically configured to:

for each carrier batch information in the carrier batch information list, set each carrier batch information to be associated with N number of supplementary security domains corresponding to each carrier batch information, where N is an integer greater than or equal to 1; and based on preset setting rules of the supplementary security domains, set each security carrier chip with the first carrier batch information as presetting first supplementary security domain or creating dynamically the first supplementary security domain, where the first supplementary security domain is any supplementary security domain among the N number of supplementary security domains corresponding to each carrier batch information.

Optionally, the configuration module 203 is also specifically configured to:

for each carrier batch information in the carrier batch information list, set each carrier batch information to be associated with the corresponding M number of card applications, where M is an integer greater than or equal to 1; and based on preset setting rules of the card applications, set each security carrier with each carrier batch information as presetting first card application or dynamic loading the first card application, where the first card application is any card application among the M number of card applications corresponding to the first carrier batch information.

If determining each security carrier with each carrier batch information is configured as dynamic loading the first card application, set each security carrier with each carrier batch information for presetting the application installation package of the first card application or non-presetting the application installation package of the first card application.

Optionally, the configuration module 203 is also specifically configured to:

for each carrier batch information in the carrier batch information list, based on preset configuration rules of the application providers, configure each carrier batch information to be associated with corresponding P number of application providers, and configure each security carrier with each carrier batch information to access applications provided by a first application provider, where the first application provider is any application provider among the P number of application providers.

Figure 3:
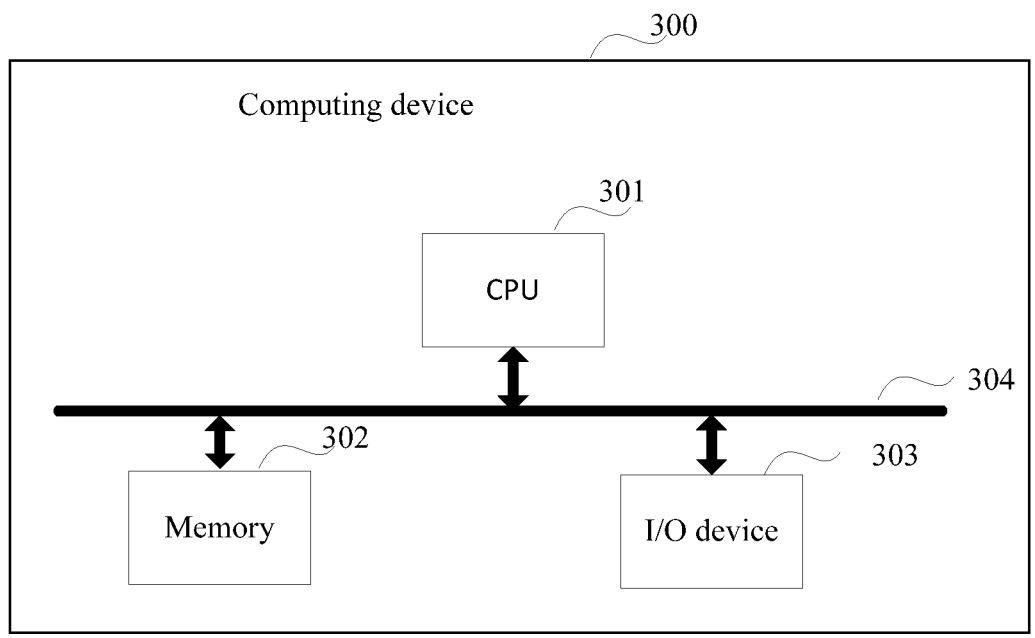
FIG. 3 illustrates a schematic structure of a computing device according to an embodiment of the present invention.

Based on the same disclosing concept, an embodiment of the present invention also provides a computing device. The computing device 300 may specifically be a desktop computer, a portable computer, a smart phone, a tablet computer, a PDA (Personal Digital Assistant, PDA) and so on. FIG. 3 illustrates a schematic structure of a computing device according to an embodiment of the present invention. As shown in FIG. 3, the computing device 300 may include a CPU 301 (Center Processing Unit, CPU), a memory 302, input/output devices 303, a bus system 304 and so on. The input devices may include a keyboard, a mouse, a touch screen, etc. The output device may include a display device, such as an LCD (liquid crystal display, LCD), an CRT (cathode ray tube, CRT) and so on.

The memory 302 may include a ROM (read only memory) and a RAM (random access memory), which provide program instructions and data stored in the memory for the processor. In an embodiment of the present invention, the memory may be used to store any program provided by any embodiment of the present invention. The processor performs the method disclosed by any above embodiment according to the obtained program instructions by calling the program instructions stored in the memory.

Based on the same disclosing concept, an embodiment of the present invention also provides a computer-readable storage medium that is used to store computer program instructions used by the above computing device, comprises the program for performing the method disclosed by any above embodiment.

The computer storage media may be any available medium or data storage device accessed by a computer, including but not limited to a magnetic storage (e.g., a floppy disk, a hard disk, a magnetic tape, a magneto-optical disk (MO), etc.), an optical storage (e.g., CD (compact disc), DVD (digital versatile disc), BD (Blu-ray disc), HVD (holographic versatile disc), etc.), and a semiconductor memory (e.g., a ROM, an EPROM (erasable programmable ROM), an EEPROM (electrically erasable programmable ROM), a NAND FLASH, a SSD (solid-state disk)) and so on.

Based on the same disclosing concept, an embodiment of the present invention also provides a computer program product. When the computer program product runs on the computer, such that the computer executes the above-mentioned method according to the embodiment of the disclosure.

Thus, according to the above description, in the embodiments of the present disclosure, by adding a carrier batch field to a security carrier list, for each security carrier in the security carrier list, encoding a plurality of pieces of batch feature information of the security carrier according to a preset encoding rule, so as to generate carrier batch information of each security carrier, and adding same to the security carrier list; and then, according to identifier information and the carrier batch information of each security carrier, configuring a supplementary security domain, a card application, an application installation package and an application provider that need to be preset for each security carrier. Since the carrier batch information contains a plurality of pieces of batch feature information of the security carrier, the security carriers in the security carrier list can be effectively distinguished according to the identifier information and the carrier batch information of the security carriers, thus a plurality of preset items that need to be preset for a plurality of security carriers having the same carrier batch information can be configured, so as to improve the configuration efficiency for the plurality of preset items of the security carriers.

While certain embodiments of the present invention have been described, it is understood that a person of ordinary skill in the art can modify or change the embodiments after knowing the basic inventive concept. Therefore, the appended claims are intended to be interpreted as including the disclosed embodiments and the modifications and changes falling within the scope of the present invention.

It is apparent that those skilled in the art can make various modifications and variations to the invention without departing from the spirit and scope of the invention. Thus, it is intended that the present invention cover the modifications and variations of the invention.

What is claimed is:

1. A method for configuring a security carrier, comprising:
adding a carrier batch field to a security carrier list, wherein the security carrier list comprising at least one security carrier;
encoding, for a first security carrier in the security carrier list, a plurality of pieces of batch feature information of the first security carrier according to a preset encoding rule, so as to generate first carrier batch information of the first security carrier, and to add the first carrier batch information to the carrier batch field corresponding to a record where the first security carrier is located in the security carrier list, wherein the first security carrier is any security carrier, for which no carrier batch information has been configured, in the security carrier list; and
configuring a supplementary security domain, a card application, an application installation package and an application provider for each of the security carriers according to identifier information and the carrier batch information of each security carrier in the security carrier list;
wherein configuring a supplementary security domain for each of the security carriers according to identifier information and the carrier batch information of each security carrier in the security carrier list comprises:
for each carrier batch information in the carrier batch information list, setting each carrier batch information to be associated with corresponding N number of supplementary security domains, wherein N is an integer greater than or equal to 1; and
based on preset setting rules of the supplementary security domains, setting each security carrier with each carrier batch information as at least one of presetting first supplementary security domain and creating dynamically the first supplementary security domain, wherein the first supplementary security domain is any supplementary security domain among the N number of supplementary security domains corresponding to each carrier batch information.

2. The method according to claim 1, wherein the plurality of pieces of batch feature information in the carrier batch information of the first security carrier comprises a carrier issuer identifier, a carrier type, a batch number, generation time, and a reserved bit.

3. The method according to claim 1, wherein configuring a card application and an application installation package for each of the security carriers according to identifier information and the carrier batch information of each security carrier in the security carrier list further comprises:
for each carrier batch information in the carrier batch information list, setting each carrier batch information to be associated with corresponding M number of card applications, wherein M is an integer greater than or equal to 1;
based on preset setting rules of the card applications, setting each security carrier with each carrier batch information as at least one of presetting first card application and dynamic loading the first card application, wherein the first card application is any card application among the M number of card applications corresponding to the first carrier batch information; and
when it is determined that each security carrier with each carrier batch information is configured as dynamic loading the first card application, setting each security carrier with each carrier batch information for at least one of presetting the application installation package of the first card application and non-presetting the application installation package of the first card application.

4. The method according to claim 1, wherein configuring an application provider for each of the security carriers according to identifier information and the carrier batch information of each security carrier in the security carrier list further comprises:
for each carrier batch information in the carrier batch information list, based on preset configuration rules of the application providers, configuring each carrier batch information to be associated with corresponding P number of application providers, and configuring each security carrier with each carrier batch information to access applications provided by a first application provider, wherein the first application provider is any application provider among the P number of application providers, and P is an integer greater than or equal to 1.

5. An apparatus for configuring a security carrier, comprising:
an adding module configured to add a carrier batch field to a security carrier chip list, wherein the security carrier chip list comprising at least one security carrier;

a processing module configured to encode, for a first security carrier chip in the security carrier chip list, a plurality of pieces of batch feature information of the first security carrier chip according to a preset encoding rule, so as to generate first carrier batch information of the first security carrier chip, and to add the first carrier batch information to the carrier batch field corresponding to a record where the first security carrier chip is located in the security carrier chip list, wherein the first security carrier chip is any security carrier chip, for which no carrier batch information has been configured, in the security carrier chip list; and a configuration module configured to configure a supplementary security domain, a card application, an application installation package and an application provider for each of the security carrier chips according to identifier information and the carrier batch information of each security carrier chip in the security carrier chip list;

wherein the configuration module is further configured to:

for each carrier batch information in the carrier batch information list, set each carrier batch information to be associated with corresponding N number of supplementary security domains, wherein N is an integer greater than or equal to 1; and based on preset setting rules of the supplementary security domains, set each security carrier chip with each carrier batch information as at least one of presetting first supplementary security domain and creating dynamically the first supplementary security domain, wherein the first supplementary security domain is any supplementary security domain among the N number of supplementary security domains corresponding to each carrier batch information.

6. The apparatus according to claim 5, wherein the plurality of pieces of batch feature information in the carrier batch information of the first security carrier chip comprises a carrier issuer identifier, a carrier type, a batch number, generation time, and a reserved bit.

7. The apparatus according to claim 5, wherein the configuration module is further configured to:

for each carrier batch information in the carrier batch information list, set each carrier batch information to be associated with the corresponding M number of card applications, wherein M is an integer greater than or equal to 1;

based on preset setting rules of the card applications, set each security carrier chip with each carrier batch information as at least one of presetting first card application and dynamic loading the first card application, wherein the first card application is any card application among the M number of card applications corresponding to the first carrier batch information; and when it is determined that each security carrier chip with each carrier batch information is configured as dynamic loading the first card application, set each security carrier chip with each carrier batch information for at least one of presetting the application installation package of the first card application and non-presetting the application installation package of the first card application.

8. The apparatus according to claim 5, wherein the configuration module is further configured to:

for each carrier batch information in the carrier batch information list, based on preset configuration rules of the application providers, configure each carrier batch information to be associated with corresponding P number of application providers, and configure each security carrier chip with each carrier batch information to access applications provided by a first application provider, wherein the first application provider is any application provider among the P number of application providers, and P is an integer greater than or equal to 1.

9. A computing device, comprising:

a memory configured to store program instructions; and a processor configured to call the program instructions stored in the memory, and execute the obtained program to perform adding a carrier batch field to a security carrier chip list;

encoding, for a first security carrier chip in the security carrier chip list, a plurality of pieces of batch feature information of the first security carrier chip according to a preset encoding rule, so as to generate first carrier batch information of the first security carrier chip, and to add the first carrier batch information to the carrier batch field corresponding to a record where the first security carrier chip is located in the security carrier chip list, wherein the first security carrier chip is any security carrier chip, for which no carrier batch information has been configured, in the security carrier chip list; and configuring a supplementary security domain, a card application, an application installation package and an application provider for each of the security carriers according to identifier information and the carrier batch information of each security carrier in the security carrier list:

wherein configuring a supplementary security domain for each of the security carriers according to identifier information and the carrier batch information of each security carrier in the security carrier list comprises:

for each carrier batch information in the carrier batch information list, setting each carrier batch information to be associated with corresponding N number of supplementary security domains, wherein N is an integer greater than or equal to 1; and based on preset setting rules of the supplementary security domains, setting each security carrier with each carrier batch information as at least one of presetting first supplementary security domain and creating dynamically the first supplementary security domain, wherein the first supplementary security domain is any supplementary security domain among the N number of supplementary security domains corresponding to each carrier batch information.

10. A non-transitory computer-readable storage medium, storing computer-executable instructions configured to enable a computer to perform the method according to claim 1.

11. A computer program product comprising a non-transitory computer-readable medium that, when executed by a computer, configured to enable a computer to perform the method according to claim 1.

* * * * *